Patented Aug. 21, 1951

2,565,300

UNITED STATES PATENT OFFICE 2,565,300

UNSYMMETRICAL DICHLORO-DIHYDROXY-BENZOPHENONES AND A METHOD FOR THEIR PRODUCTION

Herman E. Faith, New Palestine, and Herbert J. Florestano, Indianapolis, Ind., assignors to Allied Laboratories, Inc., Kansas City, Mo., a corporation of Delaware No Drawing. Application June 13, 1950, Serial No. 167,932

4 Claims. (Cl. 260—591)

This invention is directed to unsymmetrical dichlorodihydroxybenzophenones represented by the following formulae:

I 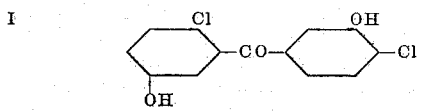

and

II 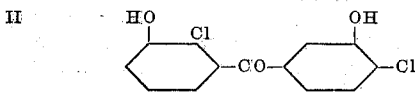

The compounds have been found valuable in the preparation of more complex organic compounds and as constituents of veterinary medicines and as fungicidal and bactericidal agents.

Our compounds may be prepared by either of the following methods, depending upon the starting material employed.

METHOD A

The following series of reactions illustrates the preparation of the compound of Formula I:

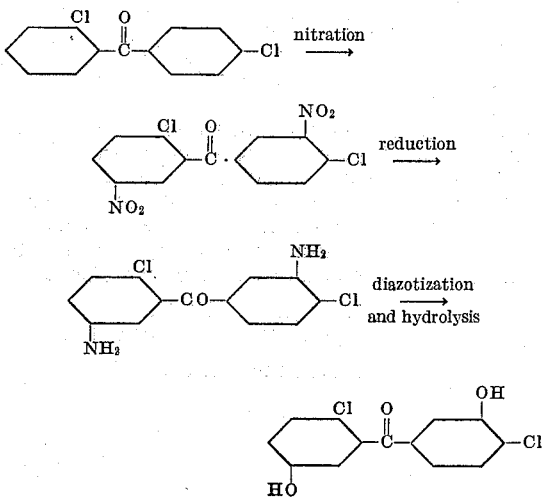

METHOD B

The following series of reactions illustrates the preparation of the compound of Formula II:

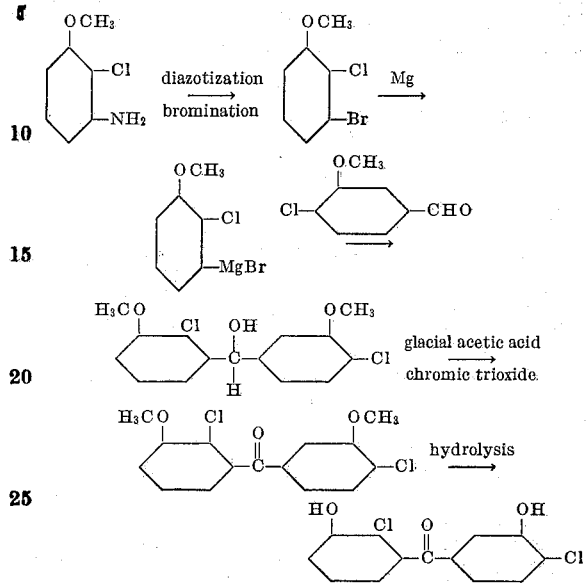

The following specific examples illustrate the invention:

EXAMPLE I

*Production of 2,4'-dichloro-5,3'-dihydroxybenzophenone*

STEP 1.—2,4'-DICHLORO-5,3'-DINITROBENZOPHENONE

One hundred grams of technical 2,4'-dichlorobenzophenone are dissolved with cooling into 1000 ml. of fuming nitric acid. The reactants are heated to 50° C. with stirring for 1.5 hours and then the mixture is poured into about 1500 ml. of cold water. The precipitated dinitro compound is filtered off and crystallized from glacial acetic acid.

STEP 2.—2,4'-DICHLORO-5,3'-DIAMINOBENZOPHENONE

A solution of hydrogen chloride in 95% ethyl alcohol is prepared by saturating the alcohol with hydrogen chloride at room temperature. Then 169.6 g. of stannous chloride dihydrate are dissolved in the acid-alcohol solution and 32.4 g. of 2,4′-dichloro-5,3′-dinitrobenzophenone are added. The temperature of the resultant solution rises to 55° C., and it is maintained at that point for about fifteen minutes by cooling. When the temperature begins to drop, the cooling is discontinued and the mixture is kept at 55 to 60° C. with stirring for one hour. The mixture is cooled and filtered. The crystalline product is dissolved in water and poured into an excess of dilute sodium hydroxide solution to remove the tin salts. The yellow undissolved portion is filtered off and washed with water. The 2,4′-dichloro-5,3′-diaminobenzophenone can be purified by crystallizing from the aqueous methanol solution.

STEP 3.—2,4′-DICHLORO-5,3′-DIHYDROXYBENZOPHENONE

Twenty-one grams of 2,4′ - diaminobenzophenone are dissolved in 40 ml. of water containing 33 ml. of concentrated sulfuric acid. This solution is diazotized with 11 g. of sodium nitrite in 25 ml. of water at 0° C. The diazotized solution is poured gradually into a boiling solution of 75 ml. of water and 100 ml. of concentrated sulfuric acid. The mixture is stirred for ten minutes after the addition of the diazotized solution and is then cooled and diluted to twice its volume with water. The precipitated 2,4′-dichloro-5,3′-dihydroxybenzophenone is crystallized from water or toluene; M. P. 161° C. It is soluble in dilute sodium hydroxide solution.

EXAMPLE II

*Production of 2,4′-dichloro 3,3′-dihydroxybenzophenone*

STEP 1.—2-CHLORO-3-BROMOANISOLE

Fourteen and one-half grams of 2-chloro-3-aminoanisole are added to 151 g. of 40% hydrobromic acid. The mixture is stirred and diazotized at 0 to 5° C. with 6.35 g. of sodium nitrate in 21 ml. of water. This diazotized solution is added with stirring to a freshly prepared cuprous bromide solution made from 7.13 g. of cupric sulfate pentahydrate. The temperature of the cuprous bromide solution is kept at 75° C. during that addition. An oil forms. The mixture is allowed to stand overnight at room temperature after the addition of 15 ml. of 48% hydrobromic acid. Then the mixture is diluted with water, and steam distilled. The oily distillate is dried in ether solution with magnesium sulfate and is then fractionally distilled.

STEP 2.—2,4′-DICHLORO-3,3′-DIMETHOXYBENZOHYDROL

A solution of 11.35 g. of 2-chloro-3-bromoanisole in 30 ml. of anhydrous ether is added to 1.19 g. of magnesium turning in 5 ml. of anhydrous ether. The reaction is initiated by a crystal of iodine and by warning. It is conducted in an atmosphere of nitrogen. After the mixture had refluxed spontaneously, it is kept refluxing by heating for one hour. Then to the warm solution is added gradually 8.35 g. of 3-methoxy-4-chlorobenzaldehyde in 24 ml. of anhydrous ether. The heat of reaction causes the ether to reflux. The solution is refluxed for 45 minutes after the aldehyde addition and is then poured into 175 ml. of cold 27% sulfuric acid. The acid mixture is ether extracted and the ether extract is shaken with a total of 80 ml. of cold 27% sulfuric acid to remove inorganic salts. The ether solution is dried with magnesium sulfate and concentrated after filtration. The residual product is crystallized from petroleum ether-ethyl ether solution. It is the desired 2,4′-dichloro-3,3′-dimethoxybenzohydrol.

STEP 3.—2,4′-DICHLORO-3,3′-DIMETHOXYBENZOPHENONE

A solution of 2.73 g. of 2,4′-dichloro-3,3′-dimethoxybenzohydrol in 9.5 ml. of hot glacial acetic acid is prepared. To this is added portion-wise, a solution of 1.16 g. of chromium trioxide in 1.5 ml. of water diluted to 7 ml. with glacial acetic acid. The reaction solution refluxes gently from the heat of reaction during the eight-minute addition and is kept refluxing for 22 minutes after the addition by heating. It is then poured into 250 ml. of water. The solution is extracted with ether, shaken with sodium hydroxide solution, and finally with water. The ether solution is dried over magnesium sulfate and evaporated to dryness. The solid residue is crystallized from heptane to purify.

STEP 4.—2,4′-DICHLORO-3,3′-DIHYDROXYBENZOPHENONE 2,4′ - dichloro - 3,3′ - dimethoxybenzophenone (3.28 g.) is dissolved in 36 ml. of dry chlorobenzene. Then 41.4 g. of anhydrous aluminum chloride is added in several portions. After the addition, the mixture is heated at 60° for 5.5 hours and the reactants are transferred in portions onto 120 g. of cracked ice and 20 ml. of concentrated hydrochloric acid. The chlorobenzene is removed from the mixture by steam distillation, and the acid mixture remaining in the still is filtered to remove the solid product. The solid is dissolved in dilute sodium hydroxide, and stirred with activated carbon. The filtrate yields 2,4′ - dichloro-3,3′-hydroxybenzophenone when acidified; M. P. 157 to 158.5° C. It crystallizes from toluene-heptane solution.

We claim:

1. The unsymmetrical dichlorodihydroxybenzophenones selected from the group consisting of 2,4′-dichloro-3,3′-dihydroxybenzophenone and 2,4′-dichloro-5,3′-dihydroxybenzophenone.

2. The chemical compound having the following formula:

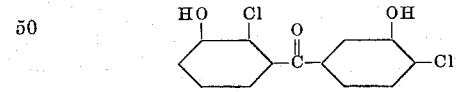

3. The chemical compound having the following formula:

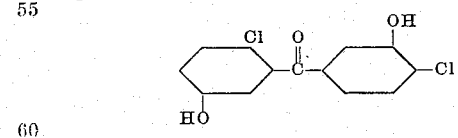

4. The process for producing an unsymmetrical dichlorodihydroxybenzophenone which includes the step of diazotizing a compound selected from the group consisting of 2,4′-dichloro-3,3′-diaminobenzophenone and 2,4′-dichloro-5,3′-diaminobenzophenone and hydrolyzing to convert the amino groups to hydroxy groups.

HERMAN E. FAITH.
HERBERT J. FLORESTANO.

No references cited.